(12) United States Patent
Sjöqvist

(10) Patent No.: US 11,543,028 B2
(45) Date of Patent: Jan. 3, 2023

(54) TRANSMISSION FOR A VEHICLE

(71) Applicant: Ningbo Geely Automobile Research & Development Co., Ltd., Ningbo (CN)

(72) Inventor: Fredrik Sjöqvist, Torslanda (SE)

(73) Assignee: NINGBO GEELY AUTOMOBILE RESEARCH & DEVELOPMENT CO., Ningbo (CN)

( * ) Notice: Subject to any disclaimer, the term of this patent is extended or adjusted under 35 U.S.C. 154(b) by 0 days.

(21) Appl. No.: 17/325,782

(22) Filed: May 20, 2021

(65) Prior Publication Data

US 2021/0285542 A1    Sep. 16, 2021

Related U.S. Application Data

(63) Continuation of application No. PCT/CN2019/120495, filed on Nov. 25, 2019.

(30) Foreign Application Priority Data

Dec. 17, 2018  (EP) .................................... 18212982

(51) Int. Cl.
*F16H 63/34* (2006.01)
*B60T 1/00* (2006.01)
(Continued)

(52) U.S. Cl.
CPC .......... *F16H 63/3483* (2013.01); *B60T 1/005* (2013.01); *F16H 61/0009* (2013.01);
(Continued)

(58) Field of Classification Search
CPC .. F16H 63/3483; F16H 61/0009; F16H 61/30; F16H 63/3425; F16H 57/0412;
(Continued)

(56) References Cited

U.S. PATENT DOCUMENTS 6,701,797 B2   3/2004 Heuver
9,677,668 B2 * 6/2017 Gunderson ........... F16D 63/006
(Continued)

FOREIGN PATENT DOCUMENTS

CN    204358079 U    5/2015
CN    106351989 A    1/2017
(Continued)

OTHER PUBLICATIONS

International Search Report and Written Opinion from corresponding International Application No. PCT/CN2019/120495, dated Mar. 2, 2020, 8 pages.
(Continued)

*Primary Examiner* — Charles A Fox
*Assistant Examiner* — Farhana Pervin
(74) *Attorney, Agent, or Firm* — Tucker Ellis LLP

(57) ABSTRACT

A transmission for a vehicle. The transmission includes a housing and a valve block arranged in the housing, and a parking lock mechanism. The parking lock mechanism has a wheel rotationally locked to a shaft of the transmission, a pawl and a hydraulic actuator arranged for engagement of the wheel and the pawl for locking the shaft. The actuator is hydraulically connected to the valve block such that the actuator is supplied by hydraulic fluid from the valve block.

18 Claims, 5 Drawing Sheets

(51) Int. Cl.
*F16H 61/00* (2006.01)
*F16H 61/30* (2006.01)
*F16H 57/04* (2010.01)
*F16H 57/00* (2012.01)

(52) U.S. Cl.
CPC ......... *F16H 61/30* (2013.01); *F16H 63/3425* (2013.01); *F16H 57/0412* (2013.01); *F16H 57/0434* (2013.01); *F16H 2057/0056* (2013.01); *F16H 2061/308* (2013.01)

(58) Field of Classification Search
CPC ......... F16H 57/0434; F16H 2057/0056; F16H 2061/308; F16H 63/3408–3483; B60T 1/005
See application file for complete search history.

(56) References Cited

U.S. PATENT DOCUMENTS

| | | |
|---|---|---|
| 2004/0248687 A1 | 12/2004 | Powell |
| 2007/0191182 A1 | 8/2007 | Koski |
| 2010/0269620 A1 | 10/2010 | Kim |
| 2011/0314945 A1* | 12/2011 | Brandenburg ...... F16H 61/0031 74/473.11 |
| 2014/0097363 A1* | 4/2014 | Young ................. F16K 31/1221 29/890.12 |
| 2017/0016533 A1 | 1/2017 | Gunderson |
| 2018/0135752 A1 | 5/2018 | Li |
| 2018/0328489 A1* | 11/2018 | Coats ................. F16H 63/3491 |
| 2020/0096102 A1* | 3/2020 | Kasami ................. F16H 59/44 |

FOREIGN PATENT DOCUMENTS

| | | |
|---|---|---|
| CN | 106352076 A | 1/2017 |
| CN | 206889662 U | 1/2018 |
| FR | 3063323 A1 | 8/2018 |
| FR | 3063324 A1 | 8/2018 |
| JP | 2017166636 A | 9/2017 |
| WO | 2018192989 A1 | 10/2018 |
| WO | 2019197742 A1 | 10/2019 |

OTHER PUBLICATIONS

Extended European Search Report from corresponding European Application No. 18212982.5, dated Sep. 19, 2019, 12 pages.
Office Action from corresponding European Application No. 18212982.5, dated Mar. 16, 2021, 18 pages.

* cited by examiner

TRANSMISSION FOR A VEHICLE

RELATED APPLICATION DATA

This application is a continuation of International Patent Application No. PCT/CN2019/120495, filed Nov. 25, 2019, which claims the benefit of European Patent Application No. 18212982.5, filed Dec. 17, 2018, the disclosures of which are incorporated herein by reference in their entireties.

TECHNICAL FIELD

The invention relates to a transmission for a vehicle, which transmission has a parking lock mechanism.

BACKGROUND

Vehicle transmissions usually have parking lock mechanisms with an actuation linkage system for engagement of a ratchet wheel and a pawl, for locking a shaft of the transmission.

Such a parking lock mechanism requires small tolerances of several components and the assembling process is relatively complicated. Further, the packing space in the transmission is often very limited.

SUMMARY

An objective of the invention is to provide a transmission for a vehicle which transmission is less complicated and enables assembling of a parking lock mechanism to be simplified.

The objective is achieved by a transmission for a vehicle, wherein the transmission comprises a housing and a valve block arranged in the housing, and a parking lock mechanism, and wherein the parking lock mechanism has a wheel rotationally locked to a shaft of the transmission, a pawl and a hydraulic actuator arranged for engagement of the wheel and the pawl for locking the shaft, and wherein the actuator is hydraulically connected to the valve block such that the actuator is supplied by hydraulic fluid from the valve block.

The invention is based on the insight that by such a transmission, a simplified actuator of the parking lock mechanism can be used, where a linkage requiring small tolerances can be omitted.

The actuator can be integrated in the valve block. Hereby, an increased available space outside the valve block can be achieved.

By integrated in the valve block is meant that at least a part of the actuator is arranged in the valve block or directly attached to the valve block. For example, if the actuator is a hydraulic cylinder with a cylinder portion, a part of the valve block, such as a plate, can constitute the cylinder portion or the cylinder portion can be arranged inside the valve block or the cylinder portion can be attached to the valve block by a bolted joint.

According to one embodiment of the transmission, the actuator is a hydraulic cylinder with a cylinder portion, a piston and a piston rod, wherein the hydraulic cylinder is arranged for moving the pawl between an engaged position and a disengaged position by means of the piston rod. Hereby, a small number of moving parts can used for providing the actuator.

According to a further embodiment, in addition to an engaged position and a disengaged position, the piston rod has an assembly position for facilitating assembling of the valve block together with the hydraulic cylinder in the transmission. Hereby, the piston rod can be positioned in the assembly position to make the valve block with the hydraulic cylinder as compact as possible during the assembling procedure. For example, the piston rod can have locking positions for the engagement position, disengagement position and the assembly position, wherein the locking position for the assembly position constitutes the locking position where the piston rod is most retracted.

According to a further embodiment, the piston rod has a conical end portion which can be inserted between the pawl and a guiding member of the parking lock mechanism for pushing the pawl into the engaged position. The guiding member can be attached to or constitute a part of the housing. Hereby, a reliable structure for engagement of the pawl and the wheel can be achieved.

According to a further embodiment, the assembly position is arranged for enabling the end portion of the piston rod to pass the guiding member during assembling of the valve block together with the hydraulic cylinder in the transmission. Hereby, both a facilitated assembling procedure and a reliable structure for engagement of the pawl and the wheel can be achieved.

According to a further embodiment, the pawl is pivotally arranged for movement about a pivot axis for engagement and disengagement of the wheel and the pawl, preferably the movement direction of the piston rod is substantially in parallel with the pivot axis of the pawl, and the pivot axis of the pawl is arranged substantially in parallel with the axial direction of the shaft to which the wheel is rotationally locked. Hereby, the compactness of the transmission can be further improved.

The invention also relates to a transmission for a vehicle in which the piston rod can be positioned in the assembly position to make a valve block with the hydraulic cylinder or the hydraulic cylinder only as compact as possible during the assembling procedure. For example, the piston rod can have locking positions for the engagement position, disengagement position and the assembly position, wherein the locking position for the assembly position constitutes the locking position where the piston rod is most retracted.

Further advantages and advantageous features of the invention are disclosed in the following description and the claims.

BRIEF DESCRIPTION OF THE DRAWINGS

With reference to the appended drawings, below follows a more detailed description of embodiments of the invention cited as examples.

In the drawings.

DETAILED DESCRIPTION

Figure 1:
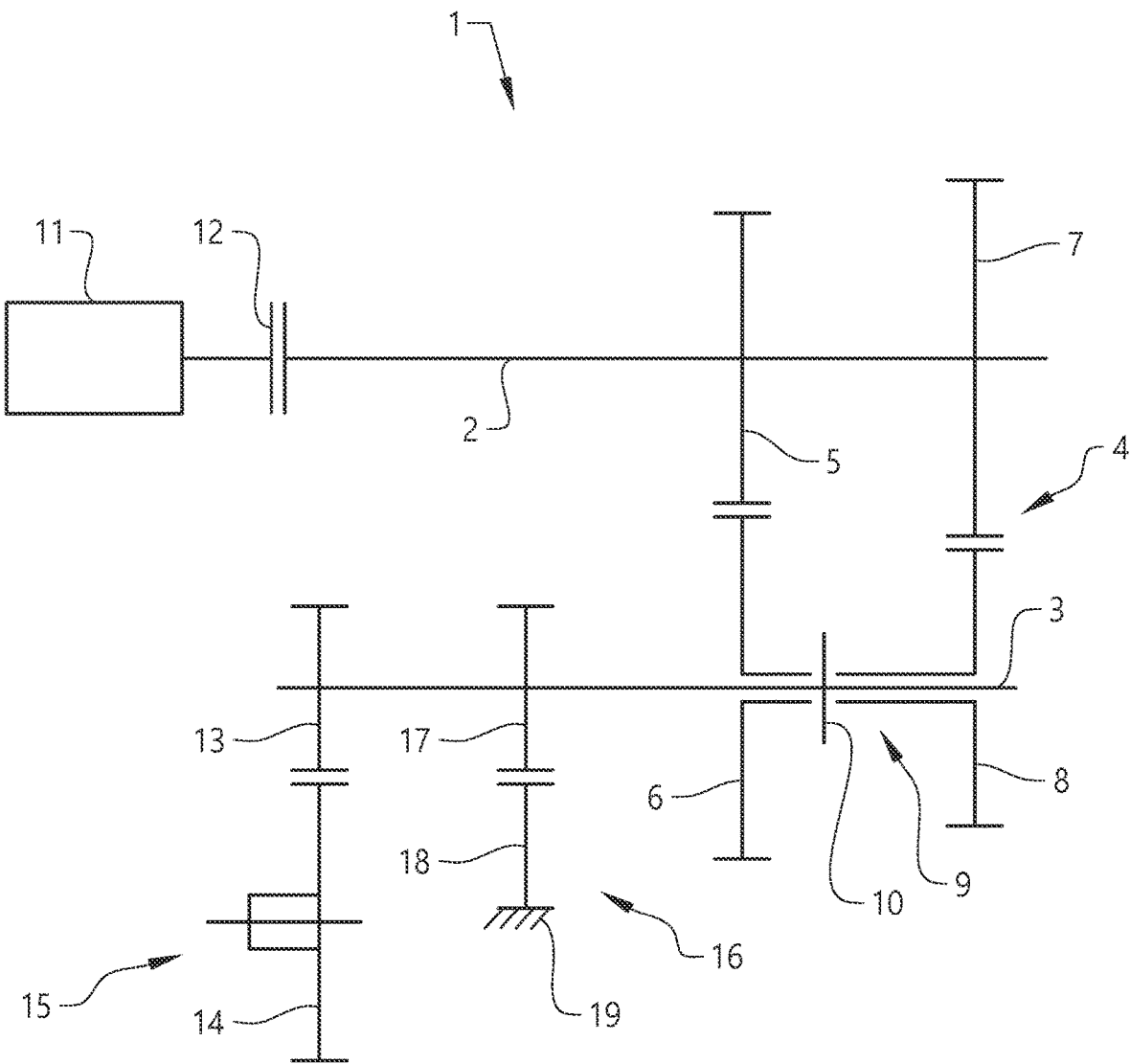
FIG. 1 is a schematic view showing a transmission for a vehicle.

FIG. 1 is a schematic view showing a transmission 1 for a vehicle. The transmission has an input shaft 2 and an output shaft 3. The input shaft 2 and the output shaft 3 are connected to each other by gear wheels 4. For example, a first gear wheel 5 of the input shaft 2 is engaged with a first gear wheel 6 of the output shaft 3, and a second gear wheel 7 of the input shaft 2 is engaged with a second gear wheel 8 of the output shaft 3. The gear wheels 6, 8 of the output shaft 3 can be idle wheels, i.e. these gear wheels 6, 8 are journaled on the output shaft 3 but can be rotationally locked to the output shaft by a synchronizer 9. By movement of a synchronizer sleeve 10 in a first direction, the first gear wheel 6 of the output shaft 3 is rotationally locked to the output shaft 3. By movement of the synchronizer sleeve 10 in a second opposite direction, the second gear wheel 8 of the output shaft 3 is rotationally locked to the output shaft 3. Thus, one gear is represented by the first gear wheel 5 of the input shaft 2 and the first gear wheel 6 of the output shaft 3. A further gear is represented by the second gear wheel 7 of the input shaft 2 and the second gear wheel 8 the output shaft 3.

The input shaft 2 can be driven by a motor 11. The motor 11 can be any suitable motor, such an internal combustion engine, electric motor, etc. Between the motor 11 and the transmission 1, a clutch 12 is suitably arranged for enabling the transmission 1 to be connected or disconnected to/from the motor 11.

In the example embodiment illustrated in FIG. 1, the output shaft 3 has an output gear wheel 13. The output gear wheel 13 is rotationally locked to the output shaft 3 and is engaged with a ring gear wheel 14 of a differential device 15, thereby connecting the output shaft 3 to the ring gear wheel 14. The differential device 15 is in turn suitably conventionally connected to the driven wheels of a vehicle (not shown).

As schematically indicated in FIG. 1, the transmission 1 comprises a parking lock mechanism 16. The parking lock mechanism 16 has a wheel 17, such as a gear wheel or ratchet wheel rotationally locked to a shaft 3 of the transmission 1. In the example embodiment illustrated in FIG. 1, the wheel 17 is arranged on the output shaft 3. The transmission 1 comprises also a pawl 18 and a hydraulic actuator (not shown in FIG. 1) for engagement of the wheel 17 and the pawl 18 for locking the output shaft 3 against rotation. Thus, the wheel 17 and the pawl 18 can be engaged and disengaged to/from each other. When the wheel 17 and the pawl 18 are engaged with each other, the output shaft 3 is locked to a housing 19 of the transmission.

Figure 2:
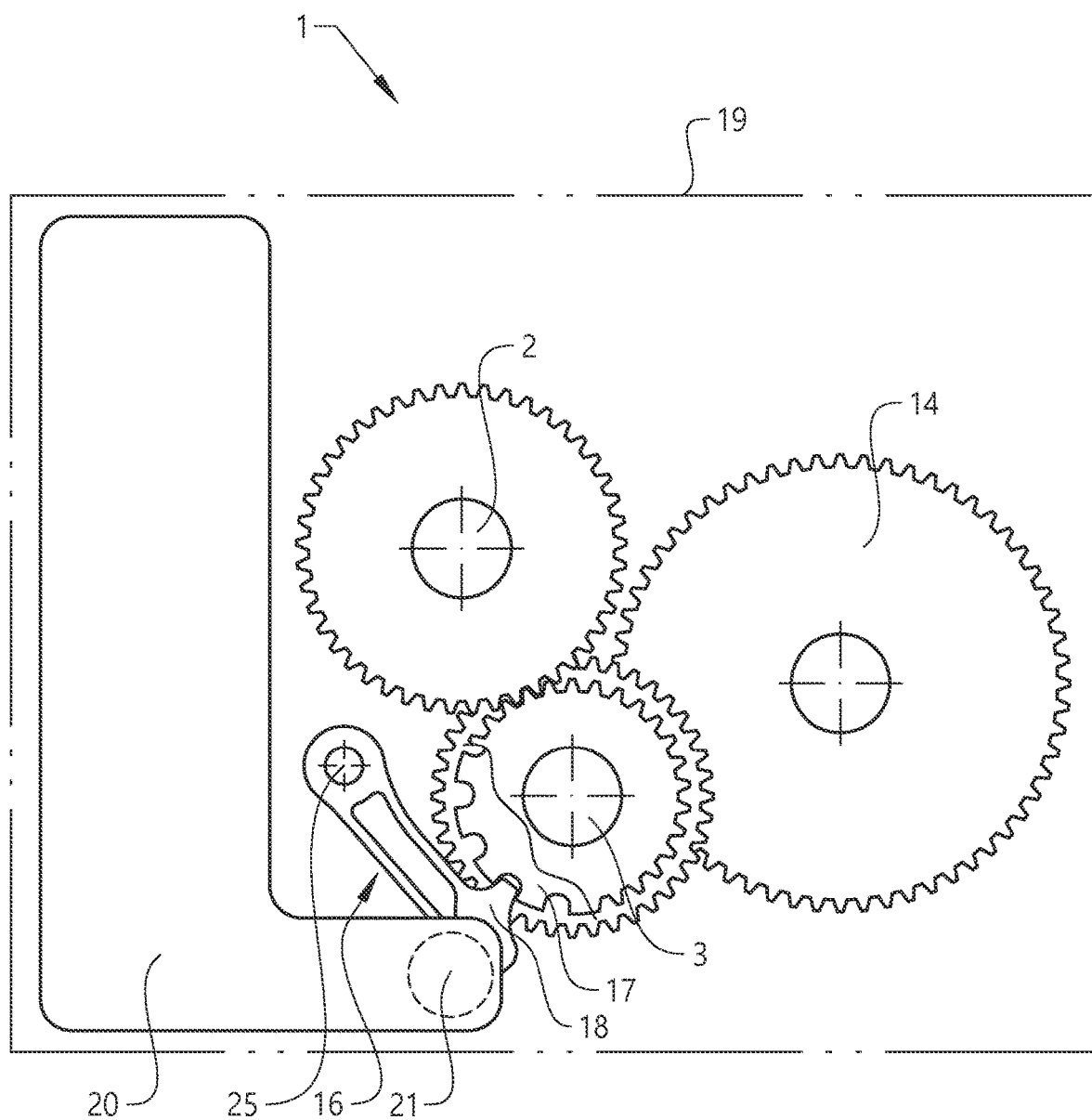
FIG. 2 is a side view of the transmission in FIG. 1.

FIG. 2 is a schematic side view of the transmission 1 showing the input shaft 2, the output shaft 3 and the ring gear wheel 14 of the differential device 15. FIG. 2 is partly cut for showing the wheel 17 and the pawl 18. The transmission 1 has a housing 19 and a valve block 20 arranged in the housing.

The valve block 20 comprises hydraulic valves (not shown) for controlling components of the transmission 1. For example, valves for controlling the clutch 12, the synchronizer sleeve 10 and for cooling and lubrication of the transmission 1 can be arranged in the valve block 20.

The actuator 21 is suitably hydraulically connected to the valve block 20, i.e. to a hydraulic connection such as a pipe or a valve of the valve block, such that the actuator 21 is supplied by hydraulic fluid from the valve block.

In the example embodiment illustrated in FIG. 2, the actuator 21 for engagement and disengagement of the wheel 17 and the pawl 18 is integrated in the valve block 20, as schematically indicated in FIG. 2.

The actuator 21 is suitably a hydraulic cylinder with a cylinder portion, a piston and a piston rod, for moving the pawl 18 between an engaged position and a disengaged position by means of the piston rod. The cylinder portion of the hydraulic cylinder 21 is suitably arranged in the valve block 20.

Figure 3A:
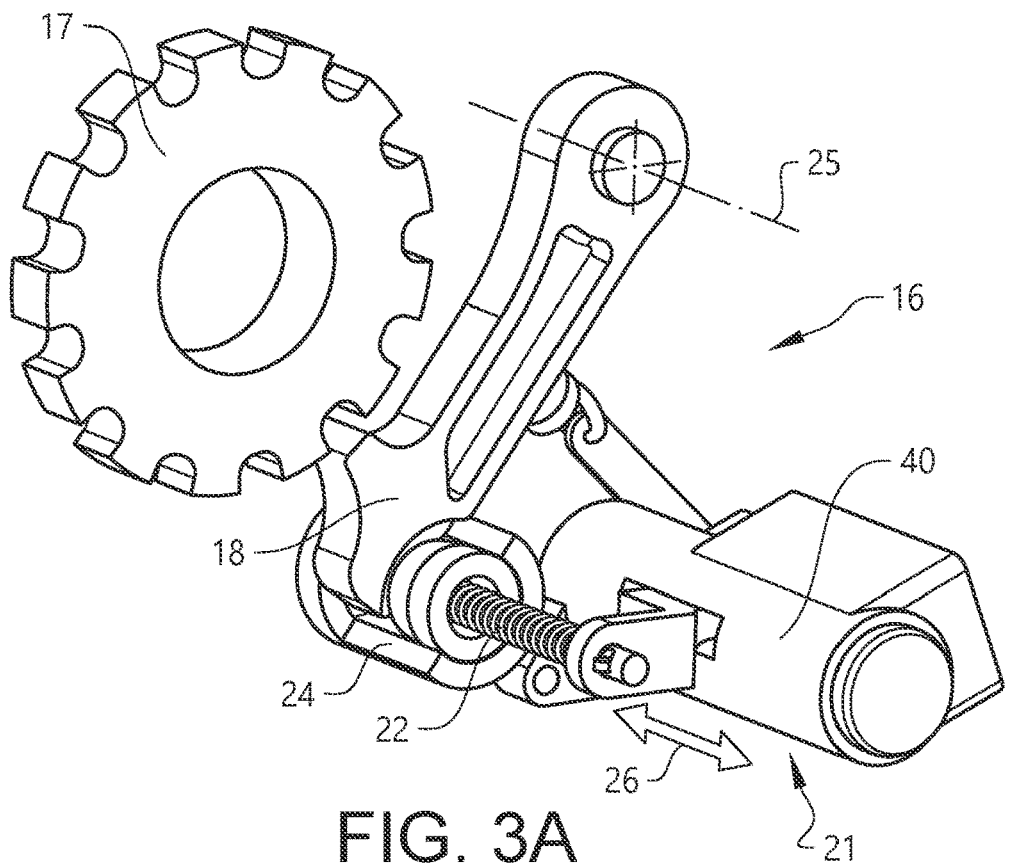
FIG. 3A is a perspective view showing a parking lock mechanism when disengaged.
Figure 3B:
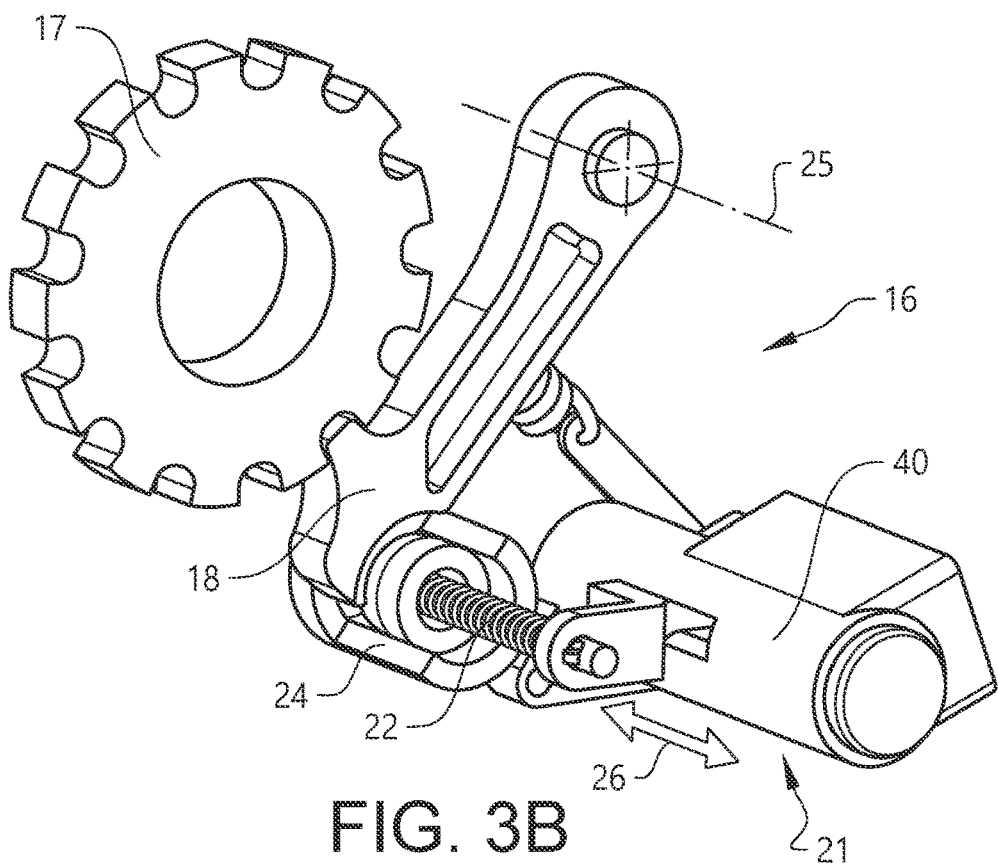
FIG. 3B is a perspective view showing a parking lock mechanism when engaged.

FIG. 3A shows the wheel 17, the pawl 18 and the piston rod 22 of the hydraulic cylinder 40 for moving the pawl 18, when the pawl 18 and the wheel 17 are disengaged from each other. Thus, the parking lock mechanism 16 is not activated and the output shaft 3 is free to rotate. FIG. 3B, which is similar to FIG. 3A, shows when the pawl 18 and the wheel 17 are engaged. Thus, the parking lock mechanism 16 is activated and the output shaft 3 is locked against rotation. The pawl 18 is pivotally arranged for movement about a pivot axis 25 for engagement and disengagement of the wheel 17 and the pawl 18. The pawl 18 is pivotally arranged at a fixed point of the transmission 1, such as the housing 19. See also FIGS. 1 and 2. By means of the piston rod 22 the pawl 18 can be pivoted about the axis 25 relative to the wheel 17 between the disengaged position and the engaged position.

Figure 4A:
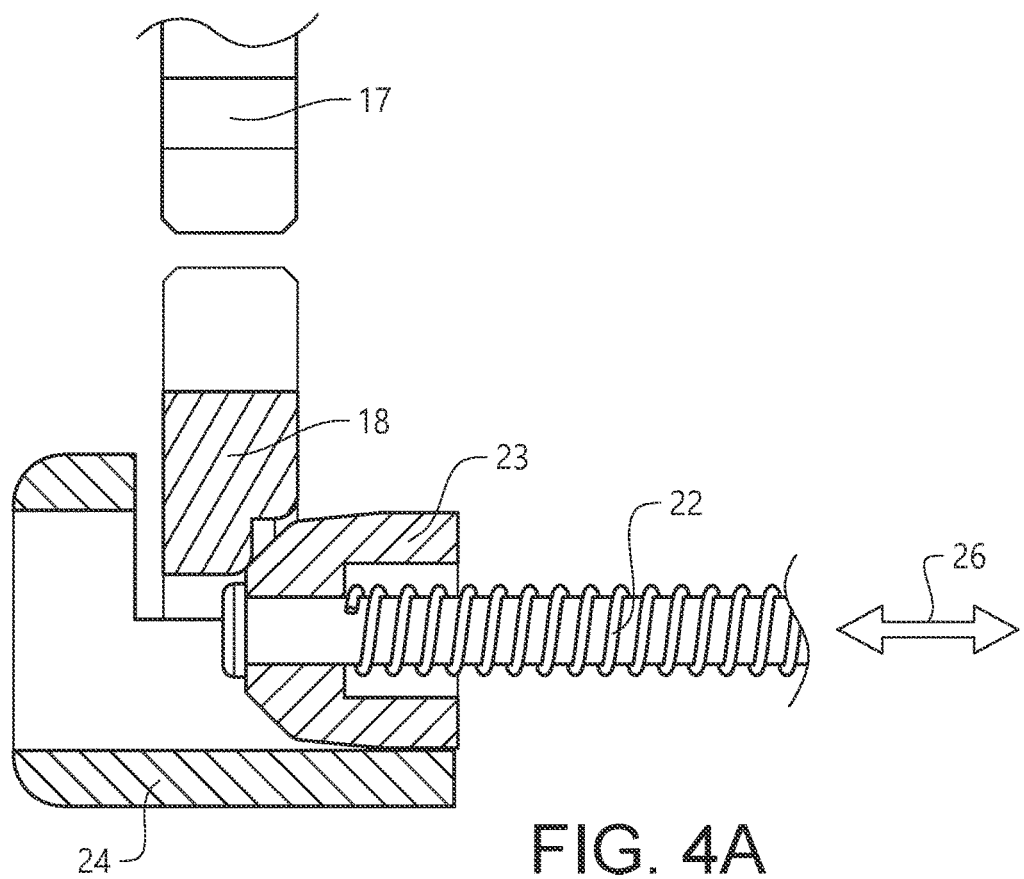
FIG. 4A is a cut view showing the parking lock mechanism in FIG. 3A.
Figure 4B:
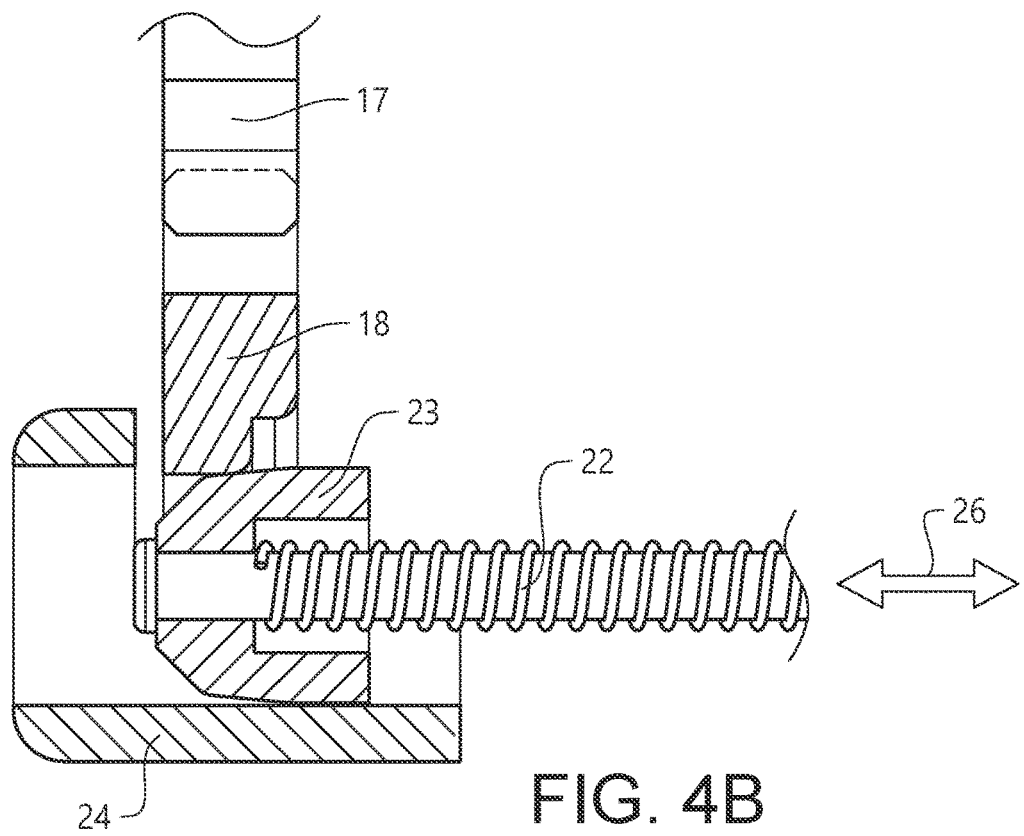
FIG. 4B is a cut view showing the parking lock mechanism in FIG. 3B.

FIG. 4A shows a cut side view of the components in FIG. 3A. The piston rod 22 has a conical end portion 23 which can be inserted between the pawl 18 and a guiding member 24 of the parking lock mechanism for pushing the pawl 18 into the engaged position. The guiding member 24 is a fixed point of the transmission 1 which is suitably attached to or constitutes a part of the housing 19. FIG. 4B, which is similar to FIG. 4A, shows when the piston rod has been pushed (to the left in FIG. 4B) into the space between the pawl 18 and the guiding member 24 such that the pawl 18 has been pivoted about the axis 25 to a position where the pawl 18 and the wheel 17 are engaged with each other.

The movement direction 26 of the piston rod 22 is preferably substantially in parallel with the pivot axis 25 of the pawl 18. Further, the pivot axis 25 of the pawl 18 is suitably arranged substantially in parallel with the axial direction of the shaft 3 to which the wheel 17 is rotationally locked.

Figure 5:
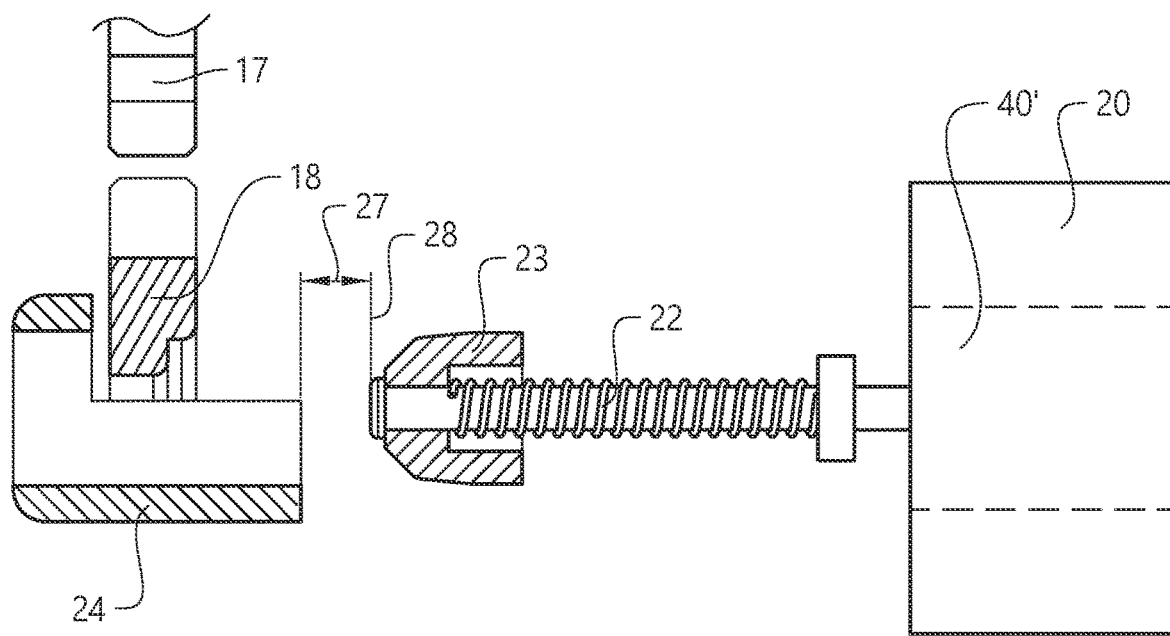
FIG. 5 shows a parking lock mechanism with a piston rod of an actuator being in an assembly position.

FIG. 5 shows another example embodiment of the hydraulic cylinder in a schematic view. The cylinder portion 40' of the hydraulic cylinder is arranged in the valve block 20 and is optionally constituted by a part of the valve block. In another embodiment the hydraulic cylinder could be arranged separately from the valve block, though preferably hydraulically connected to the valve block such that the hydraulic cylinder is supplied by hydraulic fluid from the valve block. The piston rod 22 projects from the valve block 20. In addition to the engaged position (illustrated in FIG. 4B) and the disengaged position (illustrated in FIG. 4A), the piston rod 22 has an assembly position 28 for facilitating assembling of the valve block 20 together with the hydraulic cylinder into the transmission 1. In FIG. 5, the piston rod 22 is illustrated in this assembly position 28. In the assembly position there is a clearance space 27 between the end of the piston rod 22 and the guiding member 24. The assembly position 28 is provided for enabling the end portion 23 of the piston rod 22 to pass the guiding member 24 during assembling of the hydraulic valve block 20 together with the hydraulic cylinder or, in another embodiment, during assembling of the hydraulic cylinder only.

Figure 6:
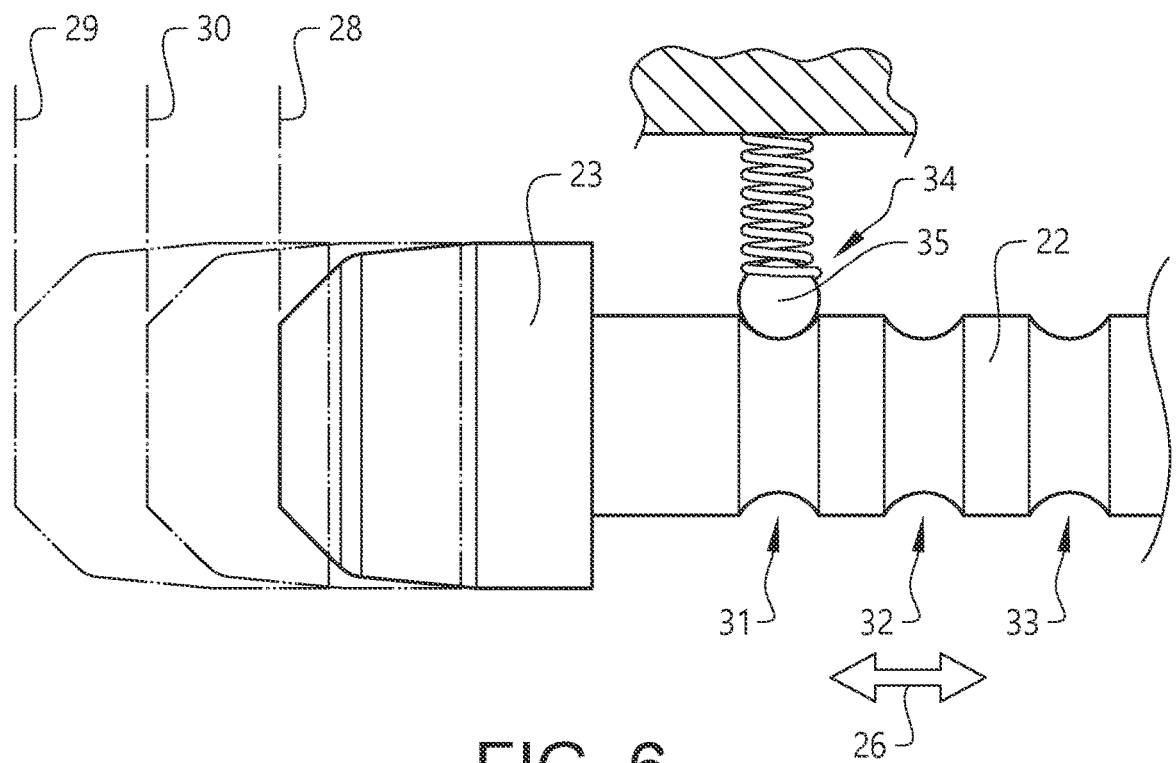
FIG. 6 shows a piston rod and locking positions for the piston rod.

FIG. 6 is a schematic view showing an example of the piston rod 22 in the assembly position 28. The engaged position 29 and the disengaged position 30 are also indicated with dashed lines. The piston rod 22 can have locking positions for the engagement position 29, disengagement position 30 and the assembly position 28. In the example embodiment illustrated in FIG. 6, the locking positions are achieved by corresponding slots 31, 32, 33 in the piston rod 22 and a blocking means 34 such as spring-loaded ball 35 to be received by such a slot 31, 32, 33. A first slot 31 for the locking position corresponding to the assembly position 28, a second slot 32 for the locking position corresponding the disengaged position 30 and a third slot 33 corresponding to the locking position for the engaged position 29. The locking position corresponding to the assembly position 28 constitutes the locking position where the piston rod 22 is most retracted (here to the right towards the valve block) for providing the clearance space 27 between the end of the piston rod 22 and the guiding member 24 as illustrated in FIG. 5.

It is to be understood that the present invention is not limited to the embodiments described above and illustrated in the drawings; rather, the skilled person will recognize that many changes and modifications may be made within the scope of the appended claims.

What is claimed is:

1. A transmission for a vehicle, the transmission comprising a housing and a valve block arranged in the housing, and a parking lock mechanism, the parking lock mechanism having a wheel rotationally locked to a shaft of the transmission, a pawl and a hydraulic actuator arranged for engagement of the wheel and the pawl for locking the shaft, the actuator being a hydraulic cylinder with a cylinder portion, a piston and a piston rod, the hydraulic cylinder being arranged for moving the pawl between an engaged position and a disengaged position by means of the piston rod, wherein the actuator is hydraulically connected to the valve block such that the actuator is supplied by hydraulic fluid from the valve block, and in addition to the engaged position and the disengaged position, the piston rod having an assembly position for facilitating assembling of the valve block together with the hydraulic cylinder in the transmission, and
wherein the piston rod has locking positions for the engagement position, disengagement position and assembly position, the locking position for the assembly position constituting the locking position where the piston rod is most retracted.

2. The transmission according to claim 1, wherein the actuator is integrated in the valve block.

3. The transmission according to claim 1, wherein the cylinder portion of the hydraulic cylinder is arranged in the valve block.

4. The transmission according to claim 3, wherein a part of the valve block constitutes the cylinder portion of the hydraulic cylinder.

5. The transmission according to claim 1, wherein the piston rod has a conical end portion which can be inserted between the pawl and a guiding member of the parking lock mechanism for pushing the pawl into the engaged position.

6. The transmission according to claim 5, wherein the guiding member is attached to or constitute a part of the housing.

7. The transmission according to claim 1, wherein the assembly position is arranged for enabling an end portion of the piston rod to pass a guiding member during assembling of the valve block together with the hydraulic cylinder in the transmission.

8. The transmission according to claim 1, wherein the pawl is pivotally arranged for movement about a pivot axis for engagement and disengagement of the wheel and the pawl.

9. The transmission according to claim 8, wherein the pivot axis of the pawl is arranged substantially in parallel with the axial direction of the shaft to which the wheel is rotationally locked.

10. The transmission according to claim 8, wherein the movement direction of the piston rod is substantially in parallel with the pivot axis of the pawl.

11. The transmission according to claim 8, wherein the valve block is arranged for controlling at least one of a clutch, one or more gears, and a cooling and lubrication device of the transmission.

12. A transmission for a vehicle, the transmission comprising a housing and a parking lock mechanism, the parking lock mechanism having a wheel rotationally locked to a shaft of the transmission, a pawl and a hydraulic actuator arranged for engagement of the wheel and the pawl for locking the shaft, the actuator being a hydraulic cylinder with a cylinder portion, a piston and a piston rod, the hydraulic cylinder being arranged for moving the pawl between an engaged position and a disengaged position by means of the piston rod, wherein in addition to the engaged position and the disengaged position, the piston rod has an assembly position facilitating assembling of the hydraulic cylinder in the transmission, and
wherein the piston rod has locking positions for the engagement position, disengagement position and assembly position, the locking position for the assembly position constituting the locking position where the piston rod is most retracted.

13. The transmission according to claim 12, wherein the piston rod has a conical end portion which can be inserted between the pawl and a guiding member of the parking lock mechanism for pushing the pawl into the engaged position.

14. The transmission according to claim 13, wherein the guiding member is attached to or constitute a part of the housing.

15. The transmission according to claim 12, wherein the assembly position is arranged to enable an end portion of the piston rod to pass a guiding member during assembling of the hydraulic cylinder in the transmission.

16. The transmission according to claim 12, wherein the pawl is pivotally arranged for movement about a pivot axis for engagement and disengagement of the wheel and the pawl.

17. The transmission according to claim 16, wherein the pivot axis of the pawl is arranged substantially in parallel with the axial direction of the shaft to which the wheel is rotationally locked.

18. The transmission according to claim 16, wherein the movement direction of the piston rod is substantially in parallel with the pivot axis of the pawl.

* * * * *